United States Patent [19]
Ford et al.

[11] Patent Number: 5,700,977
[45] Date of Patent: Dec. 23, 1997

[54] ELECTRICAL CONDUIT FIXTURE

[76] Inventors: Michael Ford, 82 Bloomfield Est., Granite Falls, N.C. 28630; Michael G. Edwards, 1980 Freedom La., Hudson, N.C. 28638

[21] Appl. No.: 677,124

[22] Filed: Jul. 9, 1996

[51] Int. Cl.[6] ................................................ H02B 1/30
[52] U.S. Cl. ................................ 174/64; 174/65 R
[58] Field of Search ................ 174/48, 50, 17 R, 174/50.51, 65 R, 60, 61, 64; 220/3.92, 3.94, 4.02, 4.03

[56] References Cited

U.S. PATENT DOCUMENTS

| | | |
|---|---|---|
| D. 291,481 | 8/1987 | Vassallo et al. |
| D. 334,380 | 3/1993 | Henneberger. |
| D. 345,413 | 3/1994 | Brown. |
| 2,511,524 | 5/1950 | Adler ........................... 333/124 |
| 3,752,350 | 8/1973 | Franck .......................... 220/444 |
| 4,600,176 | 7/1986 | Ludwigs. |
| 4,730,855 | 3/1988 | Pelletier. |
| 4,951,923 | 8/1990 | Couture. |
| 5,306,870 | 4/1994 | Abat ............................ 174/65 R |

*Primary Examiner*—Kristine L. Kincaid
*Assistant Examiner*—Dhiru R. Patel
*Attorney, Agent, or Firm*—Kennedy Covington Lobdell & Hickman L.L.P.

[57] ABSTRACT

An electrical conduit fixture for directing wire within the conduit through a directional change includes a body having walls defining an inlet and an outlet with the outlet being oriented 90° from the inlet, the body being formed in at least two matable sections with a portion of the inlet being formed in a first body section and a portion of the inlet being formed in the second body section and an arrangement for removably fastening the body sections in a mated relationship.

13 Claims, 5 Drawing Sheets

ELECTRICAL CONDUIT FIXTURE

BACKGROUND OF THE INVENTION

The present invention relates broadly to electrical wiring and, more particularly, to an electrical conduit fixture for use in electrical wiring having a split body for ease of installation.

Electrical conduit fixtures are known generally in the electrical wiring trade for use in routing wire for commercial and residential installations. Wire is typically routed through conduits and, when the direction of the wiring must change, particularly through 90°, a fixture is used wherein the wiring is accessible for manipulation by an electrician. Typically, these fixtures are boxes made from metal or PVC and are formed with a removable plate to allow entry into the box. An electrician may then manipulate the wiring within the box.

Difficulty sometimes arises due to the confinements imposed by the box-like structure of the fixture. With only an end plate removed, the wiring within the electrical system is still confined on five sides with very little room for an electrician to grasp the wire for manipulation. Further, should new wire need to be routed, the lack of working room makes it difficult for the electrician to bend the wire through 90° and route it into the ongoing conduit.

Since most electricians charge on an hourly basis, the time it takes to manipulate wiring within the confined box can add to the cost of structural electrical work.

SUMMARY OF THE INVENTION

It is accordingly an object of the present invention to provide an electrical conduit fixture which provides an open working area while retaining the necessary structure to comply with local electrical codes.

It is further an object of the present invention to provide such an electrical conduit fixture which is inexpensive and easy to manufacture.

To that end, an electrical conduit fixture for directing wire within the conduit through a directional change includes a body portion having walls defining an inlet aperture and walls defining an outlet aperture formed therein, the outlet aperture being oriented with the inlet aperture in a predetermined angular relationship of less than 180°. The body portion is formed in at least two matable sections, with a portion of the inlet forming walls being formed in a first body section and a portion of the inlet walls being formed in a second body section with the outlet forming walls being formed in a second body section. The present invention further includes an arrangement for removably fastening the body sections in a mated relationship.

It is preferred that the inlet aperture be defined by a cylindrical member projecting outwardly from the body portion with the cylindrical member being formed in two sections, with a first cylindrical section being formed integrally with the first body section and a second cylindrical section being formed integrally with the second body section with the first and second cylindrical sections being formed within walls configured for mating engagement with one another.

The present invention preferably further includes a collar fitted to the body portion at the inlet aperture radially inwardly from the first cylindrical section and second cylindrical section. The collar is preferably formed with an annular shoulder member and the first and second cylindrical sections are each formed with a corresponding recess to accept the shoulder for retaining the collar intermediate the first and second cylindrical sections. Further, a gasket is disposed intermediate the collar and the first and second cylindrical sections.

The present invention further includes an arrangement for sealing a junction between the first body section and the second body section with the sealing arrangement preferably including a gasket.

It is preferred that the predetermined angular relationship between the inlet and outlet be defined by an angle of 90°.

A second preferred embodiment of the present invention includes a body portion having walls defining an inlet aperture and walls defining an outlet aperture formed therein with the outlet aperture being oriented with the inlet aperture in a predetermined angular relationship of less than 180° with the body portion being formed in at least two matable sections. A portion of the inlet forming walls is formed in a first body section and a portion of the inlet forming walls is formed in a second body section. Similarly, a portion of the outlet forming walls is formed in the first body section and a portion of the outlet forming walls is formed in a second body section. The second preferred embodiment also includes an arrangement for removably fastening the body sections in a mated relationship. The remainder of the second preferred embodiment of the present invention is formed similarly to the above and it may be appreciated that the primary distinction between the two preferred embodiments is the plane through which the body portion is split to achieve the matable body sections. The first preferred embodiment is split through a plane which intersects only the inlet forming cylinder while the second preferred embodiment is split through a plane which intersects both the inlet and outlet cylinders.

In the lexicon of electrical conduit work, the first preferred embodiment is known as an "LB". The second preferred version is known either an "LL" or "LR".

By the above, the present invention provides an electrical conduit fixture which offers an electrician room to efficiently route wiring and still provide the necessary protection for the wiring thusly routed.

DETAILED DESCRIPTION OF THE PREFERRED EMBODIMENTS

Figure 1:
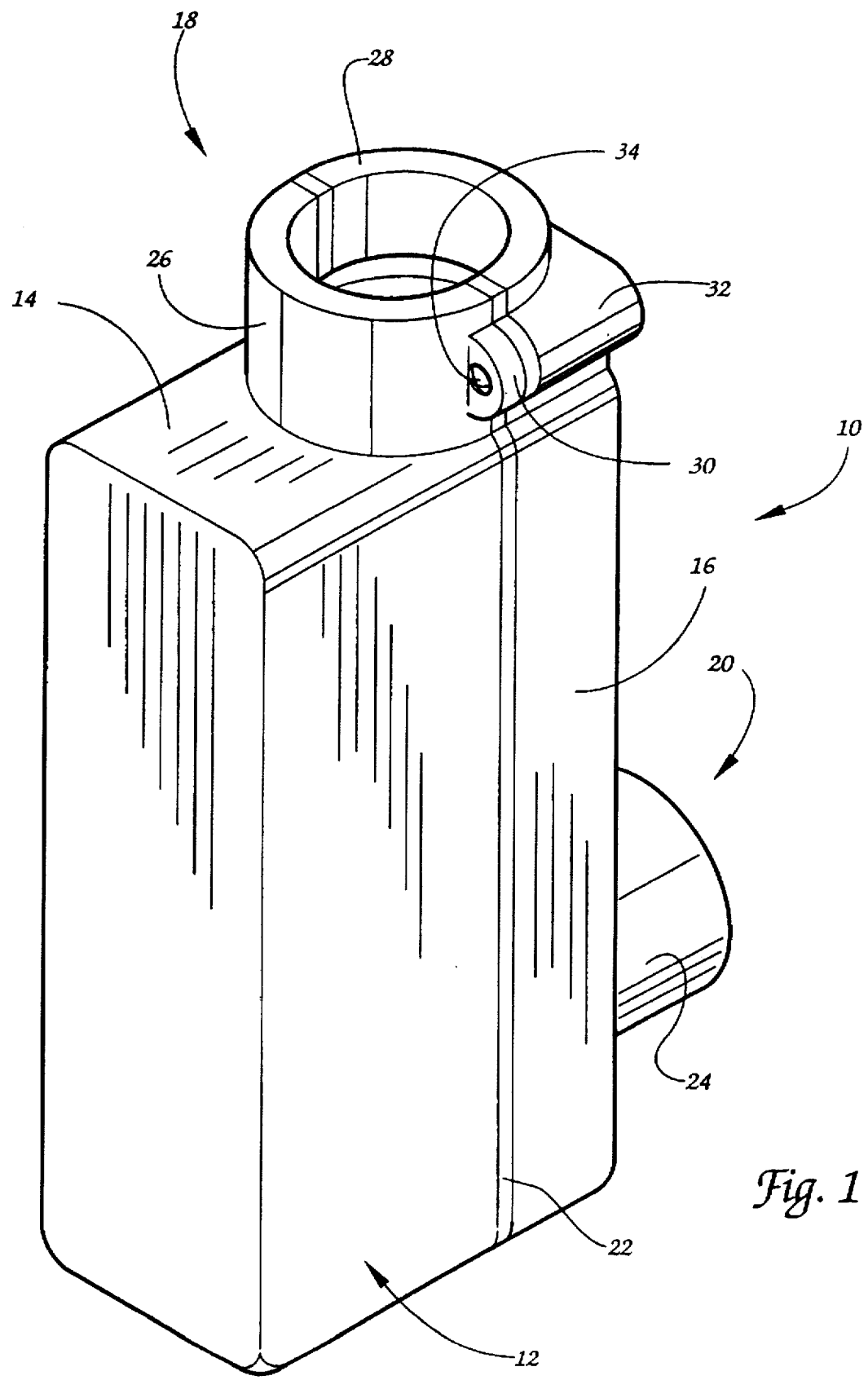
FIG. 1 is a perspective view of an electrical conduit fixture according to one preferred embodiment of the present invention.

Turning now to the drawings and, more particularly, to FIG. 1, an electrical conduit fixture according to one preferred embodiment of the present invention is illustrated generally at 10 and includes a body 12 formed as a generally rectangular unit having a body 12 formed in two sections 14,16 of substantially equal volume and similar dimensions. The body is formed with an inlet 18 and an outlet 20. The inlet 18 and the outlet 20 are oriented with a predetermined angular relationship. As seen in FIG. 1, the angular relationship between the inlet 18 and the outlet 20 is 90°. The inlet 18 and the outlet 20 are formed as cylinders projecting outwardly from the body 12.

As mentioned above, the body 12 is formed in two sections 14,16. The first body section 14 includes a cylindrical portion 26, which is formed as half a cylinder, while the second body section 16 includes a second cylindrical half 28 which forms the inlet 18 when the body sections 14,16 are mated together. The first body section 14 is formed as a generally rectangular box-like member having its inlet cylinder half 26 projecting from one side wall thereof. A portion of the walls forming the first body section 14 defines a semicircular opening disposed radially inwardly from the first cylinder half 26.

Figure 3:
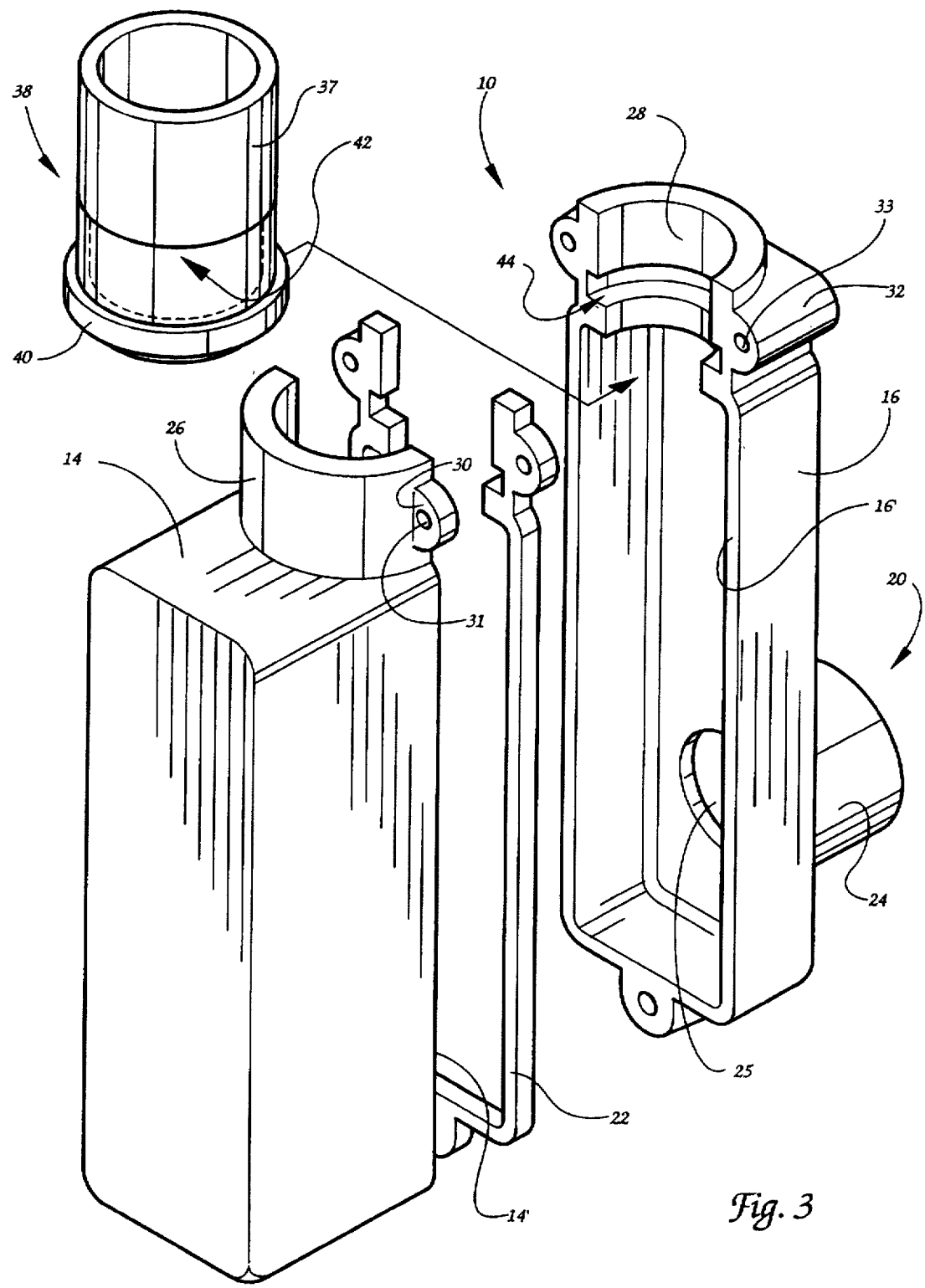
FIG. 3 is an exploded view of the electrical conduit fixture illustrated in FIG. 1.

The second body portion 16 is formed similarly to the first body portion 14 except that the outlet cylinder 24 projects outwardly therefrom. As may be expected, there is a corresponding opening 25, which is best seen in FIG. 3, formed in one wall of the second body section 16. Further, the second portion of the inlet 18 is formed in one wall of the second body section 16 such that the inlet 18 and the outlet 20 are oriented 90° from one another.

With continued reference to FIGS. 1 and 3, the body sections 14,16 are each formed with a mating surface 14',16' as seen in FIG. 3. A form-fitting gasket 22 is configured for fitment intermediate the first body section 14 and the second body section 16. The first body section 14 is formed with a flange 30 having an opening 31 formed therein. This flange 30 is formed integrally with the first cylinder portion 26 to project outwardly therefrom adjacent the mating surface 14' of the first body section 14. A corresponding flange 32 is formed in the second body portion 16 on the second cylinder portion 28 at a position corresponding to the first flange 30. As seen in the drawings, other flanges are formed in the body sections 14,16 in positions to be in registry when the body sections 14,16 are mated to form the body portion 12. As seen in FIG. 1, conventional screws 34 are fitted into openings in the flanges when the flanges are in registry to retain the body sections 14,16 in a locked, mated relationship.

Figure 2:
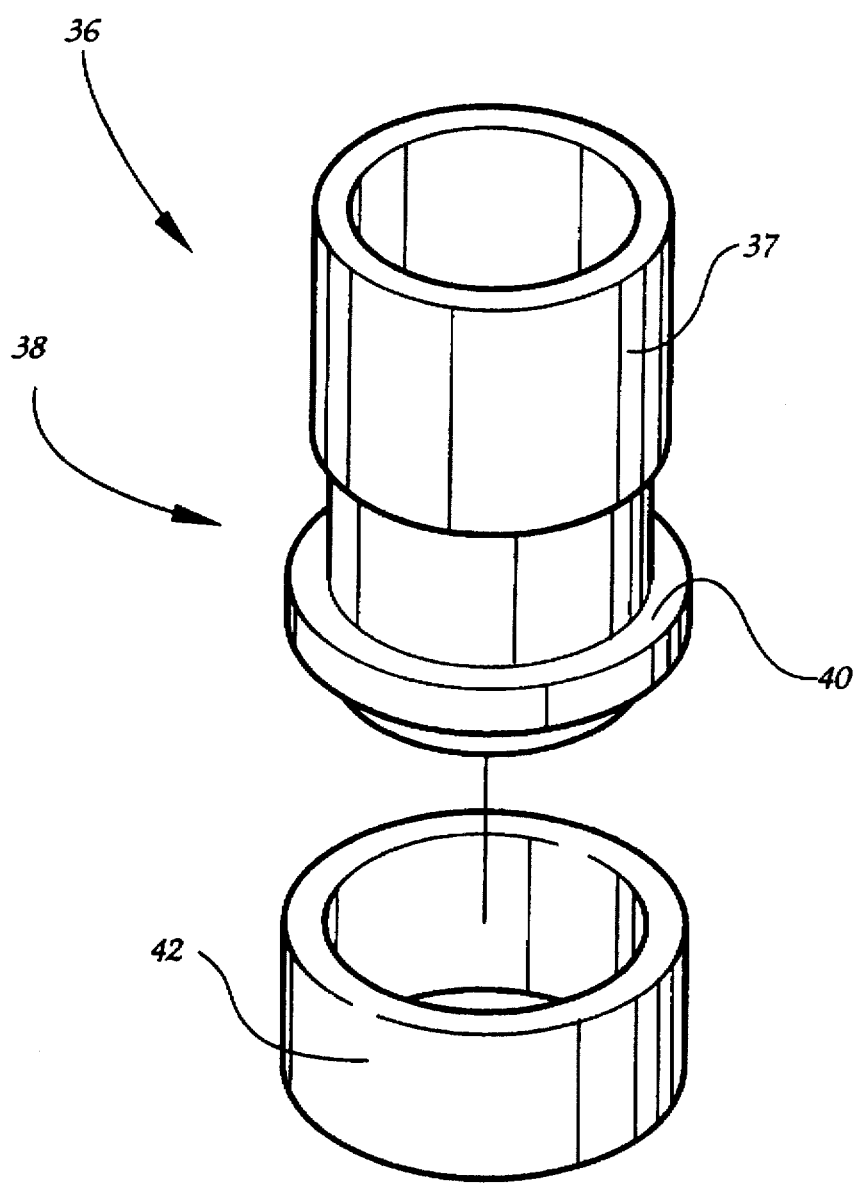
FIG. 2 is a perspective view of the collaring gasket used with both preferred embodiments of the present invention.

Turning now to FIGS. 2 and 3, the present invention further includes a collar 36 which is formed as a generally cylindrical member having a recess 38 formed perimetorially around a lower portion thereof and a shoulder 48 projecting outwardly from a lower portion thereof. A gasket 42 is also provided and formed as a hollow cylinder which is configured to fit within the recess 38 intermediate the shoulder 48 and the collar body 37. As seen in FIG. 3, the collar 36, fitted with the gasket 42, is configured for receipt within the area intermediate the two cylindrical portions 26,28 forming the inlet. The body sections 14,16 are each formed with a recess 44 in the respective cylinder portion 26,28 which is configured for receipt of the shoulder 40. Therefore, once the electrical conduit fixture 10 is assembled, the collar is rotatably disposed within the inlet cylinder sections 26, 28 with the shoulder 40 riding in the recess 44. The collar adds to the ease of assembly the unit. If multiple wires are involved, the collar 36 may be slipped over the wires and fitted to the inlet as a unit rather than trying to maintain individual wires within the inner portion of the cylinder sections 26,28 as the body sections 14,16 are assembled. This is unnecessary when routing through the outlet cylinder 24 because the body 12 is not split in this area.

Figure 4:
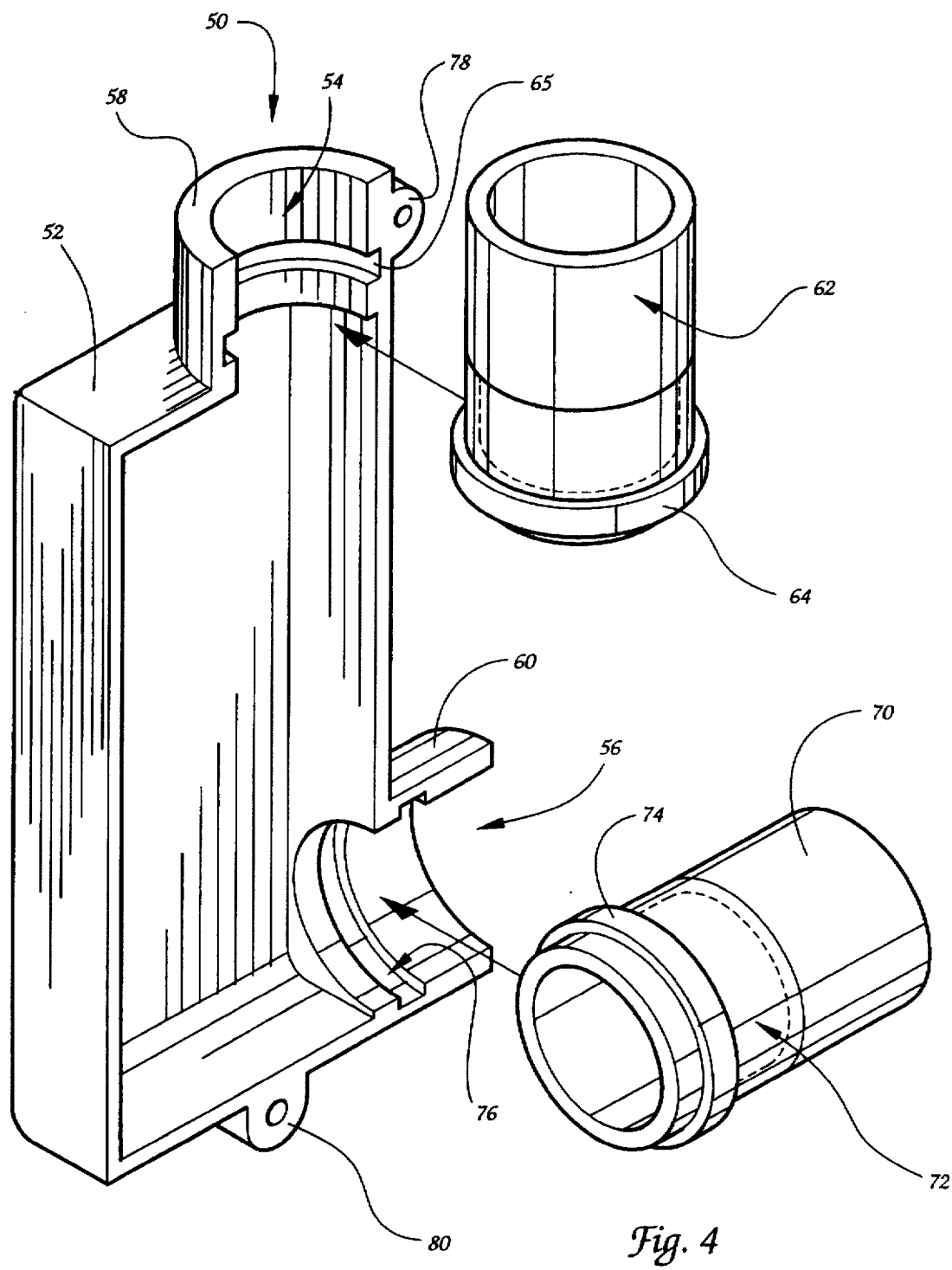
FIG. 4 is a perspective view of a first body section of a second preferred embodiment of the present invention.
Figure 5:
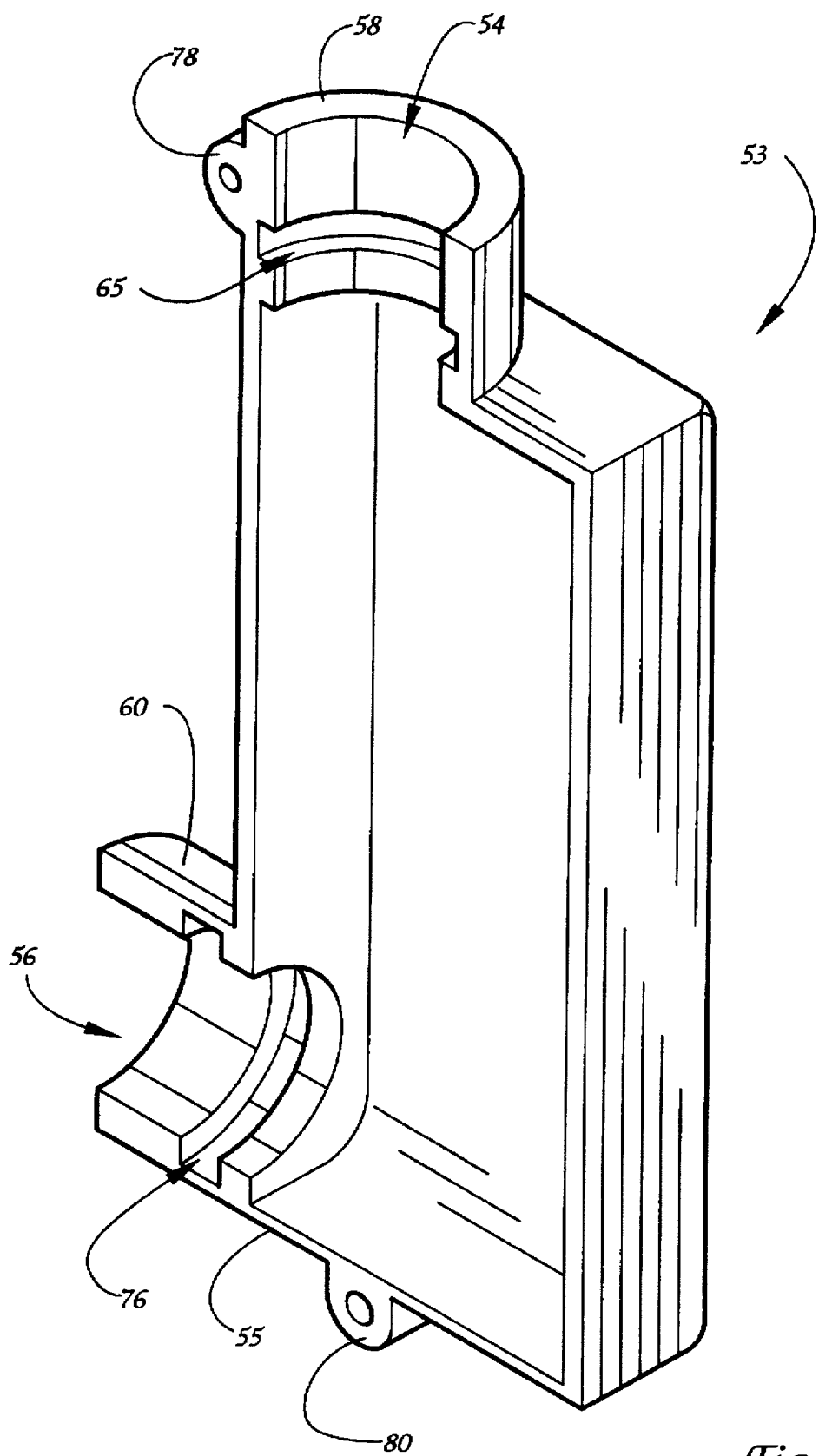
FIG. 5 is a perspective view of the other body section of the second preferred embodiment of the present invention illustrated in FIG. 4.

A second preferred embodiment of the present invention is illustrated in FIGS. 4 and 5 and requires a second collar 70. As seen in FIG. 4, a first body section 52 is formed similarly to the electrical conduit fixture of the first preferred embodiment except that it is split along a plane perpendicular to the plane along which the first preferred embodiment body 12 was split. As may be expected, this reorientation of the body split causes the outlet cylinder 60 to be split as well.

With reference to FIG. 4, the first body section 52 includes an inlet 50 and an outlet 56 including first cylinder portions 58, 60 formed integrally with the first body section 52 to project outwardly therefrom. Flanges 78, 80 are formed in the body section 52 for mounting. An upper collar 62 is provided and includes a shoulder 64 which is substantially similar to the collar 36 associated with the first preferred embodiment of the present invention. A recess 65 corresponding to the shoulder 64 is formed in the first inlet cylinder 58. Similarly, the lower collar 70 is formed with a shoulder 74 and the outlet cylinder section 60 is formed with a recess 76 into which the shoulder 74 is received. As seen in FIG. 5, a second body section 53 is formed as a mirror image of the first body section 52 and includes the same structural features. As may be expected, both collars may be slipped over the associated wiring for ease of assembly of the second preferred embodiment. It should also be noted that, while the flanges 78,80 are positioned adjacent the inlet cylinder 58 in a lower section of the body, such flanges may be formed anywhere along the body where they are convenient with the only requirement being that corresponding flanges be formed on either body portion for mating and retaining the body sections in a mated relationship.

In operation, with the first preferred embodiment of the present invention, the collar is slipped over the wiring with the wiring then being fed out of the outlet 20. The shoulder 40 associated with the collar 36 is fitted into the recess 44 on one body section 16 of the electrical conduit fixture 10. With the gasket 22 disposed intermediate the body sections 14,16, the closing body section 14 is fitted against the other body section 16 and the necessary screws 34 are attached to retain the body sections 14,16 in a mated relationship.

Similarly, and with reference to the second preferred embodiment of the present invention illustrated in FIGS. 4 and 5, both collars 62,70 are slipped over the wires and the shoulders 64,74 of the respective collar 62,70 are fitted into the recesses 65,76 formed in the inlet and outlet cylinders 50,60. The wires may then be readily fitted into the fixture 10. With gasket 55 disposed intermediate the body sections 52,53, the body sections 52,53 may be fixed in place with the flanges 78,80 in registry and conventional screws disposed within the openings therein.

By the above, the present invention provides an electrical conduit fixture which is simple to manufacture and easy to use, while providing a definite time and money savings in the field of electrical wiring.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention.

The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An electrical conduit fixture for directing wire within a conduit through a directional change, said conduit fixture comprising:

a body portion formed as first and second matable body sections having walls defining an inlet aperture, said inlet aperture being defined by a cylindrical member projecting outwardly from said body portion, said cylindrical member being formed in two sections, with a first cylindrical section being formed integrally with said first body section, and a second cylindrical section being formed integrally with said second body section, said first and second cylindrical sections being formed with end walls configured for mating engagement with one another, and walls defining an outlet aperture formed therein, said outlet aperture being oriented with said inlet aperture in a predetermined angular relationship of less than 180° with said outlet aperture forming walls being formed in said second body section, means for removably fastening said body sections in a mated relationship; and a collar fitted to said body portion at said inlet aperture radially inwardly from said first cylindrical section and said second cylindrical section.

2. An electrical conduit fixture for directing wire within a conduit through a directional change according to claim 1 wherein said collar is formed with an annular shoulder member and said first cylindrical section and said second cylindrical section are each formed with a corresponding recess to accept said shoulder for retaining said collar intermediate said first cylindrical section and said second cylindrical section.

3. An electrical conduit fixture for directing wire within a conduit through a directional change according to claim 2 and further comprising a gasket disposed intermediate said collar and said first and second cylindrical sections.

4. An electrical conduit fixture for directing wire within a conduit through a directional change according to claim 1 and further comprising means for sealing a junction between said first body section and said second body section.

5. An electrical conduit fixture for directing wire within a conduit through a directional change according to claim 4 wherein said means for sealing a junction between said first body section and said second body section is a pliant gasket.

6. An electrical conduit fixture for directing wire within a conduit through a directional change according to claim 1 wherein said predetermined angular relationship is defined by an angle of 90°.

7. An electrical conduit fixture for directing wire within a conduit through a directional change, said conduit fixture comprising:

a body portion having walls defining an inlet aperture and walls defining an outlet aperture formed therein, said outlet aperture being oriented with said inlet aperture in a predetermined angular relationship of less then 180° said body portion being formed in at least two matable sections, with a portion of said inlet aperture forming walls being formed in a first body section and a portion of said inlet aperture forming walls formed in a second body section, and a portion of said outlet aperture forming walls being formed in said first body section and a portion of said outlet aperture forming walls formed in said second body section, said inlet and outlet apertures each being defined by a cylindrical member projecting outwardly from said body portion, each said cylindrical member being formed in two sections, with a first cylindrical section being formed integrally with said first body section, and a second cylindrical section being formed integrally with said second body section, said first and second cylindrical sections being formed with end walls configured for mating engagement with one another, means for removably fastening said body sections in a mated relationship; and a collar fitted to said body portion at said inlet aperture radially inwardly from said first cylindrical section and said second cylindrical section.

8. An electrical conduit fixture for directing wire within a conduit through a directional change according to claim 7 wherein said collar is formed with an annular shoulder member and said first cylindrical section and said second cylindrical section are each formed with a corresponding recess to accept said shoulder for retaining said collar intermediate said first cylindrical section and said second cylindrical section.

9. An electrical conduit fixture for directing wire within a conduit through a directional change according to claim 8 and further comprising a collar fitted to said body portion at said outlet aperture radially inwardly from said first cylindrical section and said second cylindrical section.

10. An electrical conduit fixture for directing wire within a conduit through a directional change according to claim 9 and further comprising a gasket disposed intermediate said collar and said first and second cylindrical sections.

11. An electrical conduit fixture for directing wire within a conduit through a directional change according to claim 7 and further comprising means for sealing a junction between said first body section and said second body section.

12. An electrical conduit fixture for directing wire within a conduit through a directional change according to claim 11 wherein said means for sealing a junction between said first body section and said second body section is a pliant gasket.

13. An electrical conduit fixture for directing wire within a conduit through a directional change according to claim 7 wherein said predetermined angular relationship is defined by an angle of 90°.

* * * * *